United States Patent
Kras

(10) Patent No.: US 12,499,209 B2
(45) Date of Patent: *Dec. 16, 2025

(54) SYSTEM AND METHODS FOR MINIMIZING ORGANIZATION RISK FROM USERS ASSOCIATED WITH A PASSWORD BREACH

(71) Applicant: KnowBe4, Inc., Clearwater, FL (US)

(72) Inventor: Greg Kras, Dunedin, FL (US)

(73) Assignee: KnowBe4, Inc.

(*) Notice: Subject to any disclaimer, the term of this patent is extended or adjusted under 35 U.S.C. 154(b) by 0 days.

This patent is subject to a terminal disclaimer.

(21) Appl. No.: 18/128,394

(22) Filed: Mar. 30, 2023

(65) Prior Publication Data

US 2023/0237147 A1 Jul. 27, 2023

Related U.S. Application Data

(63) Continuation of application No. 17/829,925, filed on Jun. 1, 2022, now abandoned, which is a continuation (Continued)

(51) Int. Cl.
*G06F 21/44* (2013.01)
*G06F 21/46* (2013.01)

(Continued)

(52) U.S. Cl.
CPC ............ *G06F 21/46* (2013.01); *G06F 21/577* (2013.01); *G09B 9/00* (2013.01); *G06F 2221/034* (2013.01)

(58) Field of Classification Search
CPC ................................ G06F 21/44; H04L 63/20
See application file for complete search history.

(56) References Cited

U.S. PATENT DOCUMENTS

| 7,599,992 B2 | 10/2009 | Nakajima |
| 8,041,769 B2 | 10/2011 | Shraim et al. |

(Continued)

FOREIGN PATENT DOCUMENTS

| EP | 3 582 468 A1 | 12/2019 |
| WO | WO-2016/164844 A1 | 10/2016 |

OTHER PUBLICATIONS

Abu-Nimeh et al., "A Comparison of Machine Learning Techniques for Phishing Detection," eCrime '07: Proceedings of the anti-phishing working groups 2nd annual eCrime researchers summit, Oct. 4-5, 2007, pp. 60-69, ACM Digital Library.

(Continued)

*Primary Examiner* — Izunna Okeke
(74) *Attorney, Agent, or Firm* — Foley & Lardner LLP

(57) ABSTRACT

System and methods are disclosed for organizations to run a test against an active directory list to see if any user-provided passwords have been part of an existing data breach. Utilizing information from such a test identifies users that have weak passwords, reused passwords or shared passwords that have been associated with an earlier breach. With this information, the organization can seek to reduce risk by training staff for this specific issue in a timely and appropriate manner to significantly reduce the risk of a future breach by those identified users. Training can be customized and targeted at those users who attempt to use passwords that have been associated with a breach (either of their own account or of another account on the same or related domain.

20 Claims, 7 Drawing Sheets

Related U.S. Application Data of application No. 17/347,158, filed on Jun. 14, 2021, now Pat. No. 11,640,457, which is a continuation of application No. 16/746,662, filed on Jan. 17, 2020, now Pat. No. 11,036,848, which is a continuation of application No. 16/135,757, filed on Sep. 19, 2018, now Pat. No. 10,540,493.

(51) Int. Cl.
*G06F 21/57* (2013.01)
*G09B 9/00* (2006.01)
*H04L 29/06* (2006.01)

(56) References Cited

U.S. PATENT DOCUMENTS

| | | |
|---|---|---|
| 8,464,346 B2 | 6/2013 | Barai et al. |
| 8,484,741 B1 | 7/2013 | Chapman |
| 8,615,807 B1 | 12/2013 | Higbee et al. |
| 8,635,703 B1 | 1/2014 | Belani et al. |
| 8,719,940 B1 | 5/2014 | Higbee et al. |
| 8,793,799 B2 | 7/2014 | Fritzson et al. |
| 8,910,287 B1 | 12/2014 | Belani et al. |
| 8,966,637 B2 | 2/2015 | Belani et al. |
| 9,053,326 B2 | 6/2015 | Higbee et al. |
| 9,246,936 B1 | 1/2016 | Belani et al. |
| 9,253,207 B2 | 2/2016 | Higbee et al. |
| 9,262,629 B2 | 2/2016 | Belani et al. |
| 9,325,730 B2 | 4/2016 | Higbee et al. |
| 9,356,948 B2 | 5/2016 | Higbee et al. |
| 9,373,267 B2 | 6/2016 | Sadeh-Koniecpol et al. |
| 9,398,029 B2 | 7/2016 | Sadeh-Koniecpol et al. |
| 9,398,038 B2 | 7/2016 | Higbee et al. |
| 9,591,017 B1 | 3/2017 | Higbee et al. |
| 9,635,052 B2 | 4/2017 | Hadnagy |
| 9,667,645 B1 | 5/2017 | Belani et al. |
| 9,674,221 B1 | 6/2017 | Higbee et al. |
| 9,729,573 B2 | 8/2017 | Gatti |
| 9,813,454 B2 | 11/2017 | Sadeh-Koniecpol et al. |
| 9,870,715 B2 | 1/2018 | Sadeh-Koniecpol et al. |
| 9,876,753 B1 | 1/2018 | Hawthorn |
| 9,894,092 B2 | 2/2018 | Irimie et al. |
| 9,912,687 B1 | 3/2018 | Wescoe et al. |
| 9,942,249 B2 | 4/2018 | Gatti |
| 9,998,480 B1 | 6/2018 | Gates et al. |
| 10,243,904 B1 | 3/2019 | Wescoe et al. |
| 10,904,186 B1 | 1/2021 | Everton et al. |
| 10,986,122 B2 | 4/2021 | Bloxham et al. |
| 11,044,267 B2 | 6/2021 | Jakobsson et al. |
| 11,184,393 B1 | 11/2021 | Gendre et al. |
| 11,297,094 B2 | 4/2022 | Huda |
| 2007/0142030 A1 | 6/2007 | Sinha et al. |
| 2010/0211641 A1 | 8/2010 | Yih et al. |
| 2010/0269175 A1 | 10/2010 | Stolfo et al. |
| 2012/0124671 A1 | 5/2012 | Fritzson et al. |
| 2012/0258437 A1 | 10/2012 | Sadeh-Koniecpol et al. |
| 2013/0198846 A1 | 8/2013 | Chapman |
| 2013/0203023 A1 | 8/2013 | Sadeh-Koniecpol et al. |
| 2013/0219495 A1 | 8/2013 | Kulaga et al. |
| 2013/0297375 A1 | 11/2013 | Chapman |
| 2014/0173726 A1 | 6/2014 | Varenhorst |
| 2014/0199663 A1 | 7/2014 | Sadeh-Koniecpol et al. |
| 2014/0199664 A1 | 7/2014 | Sadeh-Koniecpol et al. |
| 2014/0201835 A1 | 7/2014 | Emigh et al. |
| 2014/0230061 A1 | 8/2014 | Higbee et al. |
| 2014/0230065 A1 | 8/2014 | Belani et al. |
| 2015/0163242 A1 | 6/2015 | Laidlaw et al. |
| 2015/0180896 A1 | 6/2015 | Higbee et al. |
| 2015/0229664 A1 | 8/2015 | Hawthorn et al. |
| 2016/0036829 A1 | 2/2016 | Sadeh-Koniecpol et al. |
| 2016/0142439 A1 | 5/2016 | Goutal |
| 2016/0164898 A1 | 6/2016 | Belani et al. |
| 2016/0173510 A1 | 6/2016 | Harris et al. |
| 2016/0234245 A1 | 8/2016 | Chapman |
| 2016/0261618 A1 | 9/2016 | Koshelev |
| 2016/0301705 A1 | 10/2016 | Higbee et al. |
| 2016/0301716 A1 | 10/2016 | Sadeh-Koniecpol et al. |
| 2016/0308897 A1 | 10/2016 | Chapman |
| 2016/0330238 A1 | 11/2016 | Hadnagy |
| 2017/0026410 A1 | 1/2017 | Gatti |
| 2017/0078322 A1 | 3/2017 | Seiver et al. |
| 2017/0104778 A1 | 4/2017 | Shabtai et al. |
| 2017/0140663 A1 | 5/2017 | Sadeh-Koniecpol et al. |
| 2017/0237776 A1 | 8/2017 | Higbee et al. |
| 2017/0244746 A1 | 8/2017 | Hawthorn et al. |
| 2017/0251009 A1 | 8/2017 | Irimie et al. |
| 2017/0251010 A1 | 8/2017 | Irimie et al. |
| 2017/0318046 A1 | 11/2017 | Weidman |
| 2017/0331839 A1* | 11/2017 | Park .................. H04L 63/1425 |
| 2017/0331848 A1 | 11/2017 | Alsaleh et al. |
| 2018/0041537 A1 | 2/2018 | Bloxham et al. |
| 2018/0063189 A1* | 3/2018 | Versteeg .............. H04L 63/083 |
| 2018/0103052 A1 | 4/2018 | Choudhury et al. |
| 2019/0173819 A1 | 6/2019 | Wescoe et al. |
| 2019/0215335 A1 | 7/2019 | Benishti |
| 2019/0245885 A1 | 8/2019 | Starink et al. |
| 2019/0245894 A1 | 8/2019 | Epple et al. |
| 2020/0311260 A1 | 10/2020 | Klonowski et al. |
| 2021/0075827 A1 | 3/2021 | Grealish |
| 2021/0185075 A1 | 6/2021 | Adams |
| 2021/0194924 A1 | 6/2021 | Heinemeyer et al. |
| 2021/0407308 A1 | 12/2021 | Brubaker et al. |
| 2022/0005373 A1 | 1/2022 | Nelson et al. |
| 2022/0006830 A1 | 1/2022 | Wescoe |
| 2022/0078207 A1 | 3/2022 | Chang et al. |
| 2022/0094702 A1 | 3/2022 | Saad Ahmed et al. |
| 2022/0100332 A1 | 3/2022 | Haworth et al. |
| 2022/0116419 A1 | 4/2022 | Kelm et al. |
| 2022/0130274 A1 | 4/2022 | Krishna Raju et al. |
| 2022/0286419 A1 | 9/2022 | Stetzer et al. |

OTHER PUBLICATIONS

Non-Final Office Action on U.S. Appl. No. 17/829,925 dtd Mar. 15, 2023.
Notice of Allowance on U.S. Appl. No. 17/347,158 dtd Feb. 27, 2023.
Palka et al., "Dynamic phishing content using generative grammars," Software Testing, Verification and Validation Workshops (ICSTW), 2015 IEEE Eighth International Conference, Date of Conference: Apr. 13-17, 2015, IEEE Xplore, pp. 1-8.
US Final Office Action on U.S. Appl. No. 16/135,757 dated Apr. 25, 2019 (7 Pages).
US Final Office Action on U.S. Appl. No. 16/746,662 dated Jun. 18, 2020 (9 Pages).
US Final Office Action on U.S. Appl. No. 17/347,158 dated Mar. 4, 2022 (10 Pages).
US Final Office Action on U.S. Appl. No. 17/347,158 dated Nov. 7, 2022 (6 Pages).
US Non-Final Office Action on U.S. Appl. No. 16/135,757 dated Nov. 29, 2018 (7 Pages).
US Non-Final Office Action on U.S. Appl. No. 16/746,662 dated Apr. 1, 2020 (9 Pages).
US Non-Final Office Action on U.S. Appl. No. 17/347,158 dated Jun. 24, 2022 (10 Pages).
US Non-Final Office Action on U.S. Appl. No. 17/347,158 dated Oct. 28, 2021 (10 Pages).
US Notice of Allowance on U.S. Appl. No. 16/135,757 dated Aug. 12, 2019 (10 Pages).
US Notice of Allowance on U.S. Appl. No. 16/135,757 dated Nov. 20, 2019 (8 Pages).
US Notice of Allowance on U.S. Appl. No. 16/746,662 dated Apr. 19, 2021 (8 Pages).
US Office Action on U.S. Appl. No. 16/746,662 dated Dec. 28, 2020 (6 Pages).

* cited by examiner

300

Executing a password breach test to determine users with passwords associated with one or more data breaches
310

Determining a plurality of users with passwords associated with one or more data breaches, and a type of password breach for each of these users
320

Selecting one or more users with a first type of password breach
330

Responsive to the selection and based on the type of password breach, generating an electronic training campaign configured to train the one or more users on using passwords
340

Communicating the electronic training campaign to one or more devices of the one or more users
350

*Fig.3*

Establishing a user risk score for each of the plurality of users and/or for an entity based on the type of password breach and/or the results from the electronic training
360

Changing one or more user properties responsive to the user's risk score or the entity risk score
370

SYSTEM AND METHODS FOR MINIMIZING ORGANIZATION RISK FROM USERS ASSOCIATED WITH A PASSWORD BREACH

CROSS-REFERENCE TO RELATED APPLICATION

This patent application is a continuation of, and claims priority to and the benefit of U.S. patent application Ser. No. 17/829,925 filed Jun. 1, 2022, and titled "SYSTEM AND METHODS FOR MINIMIZING ORGANIZATION RISK FROM USERS ASSOCIATED WITH A PASSWORD BREACH,", which a continuation of, and claims priority to and the benefit of U.S. patent application Ser. No. 17/347,158, filed Jun. 14, 2021, and titled "SYSTEM AND METHODS FOR MINIMIZING ORGANIZATION RISK FROM USERS ASSOCIATED WITH A PASSWORD BREACH,", which is a continuation of, and claims priority to and the benefit of U.S. patent application Ser. No. 16/746,662, filed Jan. 17, 2020, and titled "SYSTEM AND METHODS FOR MINIMIZING ORGANIZATION RISK FROM USERS ASSOCIATED WITH A PASSWORD BREACH,", which is a continuation of, and claims priority to and the benefit of U.S. patent application Ser. No. 16/135,757, filed Sep. 19, 2018, and titled "SYSTEM AND METHODS FOR MINIMIZING ORGANIZATION RISK FROM USERS ASSOCIATED WITH A PASSWORD BREACH," which is incorporated herein by reference.

This disclosure generally relates to security awareness systems and methods useful for minimizing ongoing organization risk that is present from users that have previously been associated with a password breach.

BACKGROUND OF THE DISCLOSURE

Poor password choices, password reuse and password sharing are poor behaviors from a security perspective. Users often choose passwords that can be easily guessed. If such passwords have previously been associated with a breach, then it is likely bad actors will try those passwords to gain access to a user's account. Users often reuse passwords. Therefore, if a breach occurs and the username and password for one login become known to bad actors, those details may also be valid for other user logins, which increases the harm that those bad actors can cause. Users also sometimes share passwords with colleagues. Therefore, a password that has been used in a breach against one user in a domain may also be of use to bad actors for other users in the same domain. Organizations are able to run a test comparing an active directory list against publicly available sources of information on password breaches to see if any user-provided passwords have been part of an existing data breach. However, this doesn't provide any training or action to prevent users from performing actions which make future passwords more likely to be susceptible. Existing solutions detect that a password has been associated with a breach and prompt the user to change it. They do not address the behaviors that led to the choice of that password.

BRIEF SUMMARY OF THE DISCLOSURE

Systems and methods are disclosed that minimize ongoing risk to an organization from user behaviors which magnify the severity of a breached or compromised password.

Organizations are able to run a test against an active directory list to see if any user-provided passwords have been part of an existing data breach. Utilizing information from such a test identifies users that have weak passwords, reused passwords or shared passwords that have been associated with an earlier breach. With this information, the organization can seek to reduce risk by training staff for this specific issue in a timely and appropriate manner to significantly reduce the risk of a future breach by those identified users. Training can be customized and targeted at those users who attempt to use passwords that have been associated with a breach (either of their own account or of another account on the same [or related] domain). By training users to follow best practice when selecting passwords (including but not limited to password reuse, sharing or using shared passwords, using weak or guessable passwords, etc.), the organization is not only mitigating the risk associated with passwords that have already been used in a breach but are also reducing the risk that the passwords selected will be used in future breaches.

In some examples, electronic training is provided to users with passwords associated with a data breach, determining one or more users associated with a type of data breach and generating an electronic training campaign for the one or more users passed on the type of data breach, and communicating the electronic training campaign to the one or more users. In some examples, users selected for an electronic training campaign may include selecting one or more users based on a number of times the one or more users or a domain of the one or more users have been subject to one or more data breaches.

In some examples, a different electronic training campaign is generated and communicated to users with passwords associated with a different type of data breach.

In some examples, a password breach test is used to determine users with passwords associated with one or more data breaches, and the results of the password breach test are stored in a data storage. One example of a type of password data breach is a data breach associated with the user. Another example of a type of password data breach is a data breach associated with another user within the same domain.

A risk score for each user may be established based on the type of password breach and/or the results from the electronic training provided to the user. An entity risk score may be stablished for an entity that is associated with the plurality of users, for example based on the type of password breach and/or the results from the electronic training provided to the users. One or more user properties may be changed responsive to the user's risk score or to the entity's risk score.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 3 depicts an implementation of a method for providing password electronic training to users.

DETAILED DESCRIPTION

For purposes of reading the description of the various embodiments below, the following descriptions of the sections of the specifications and their respective contents may be helpful:

Section A describes a network environment and computing environment which may be useful for practicing embodiments described herein.

Section B describes embodiments of systems and methods for creating and executing specific security awareness training campaigns by a security awareness system, wherein the training campaigns utilize breached password test information.

A. Computing and Network Environment

Figure 1A:
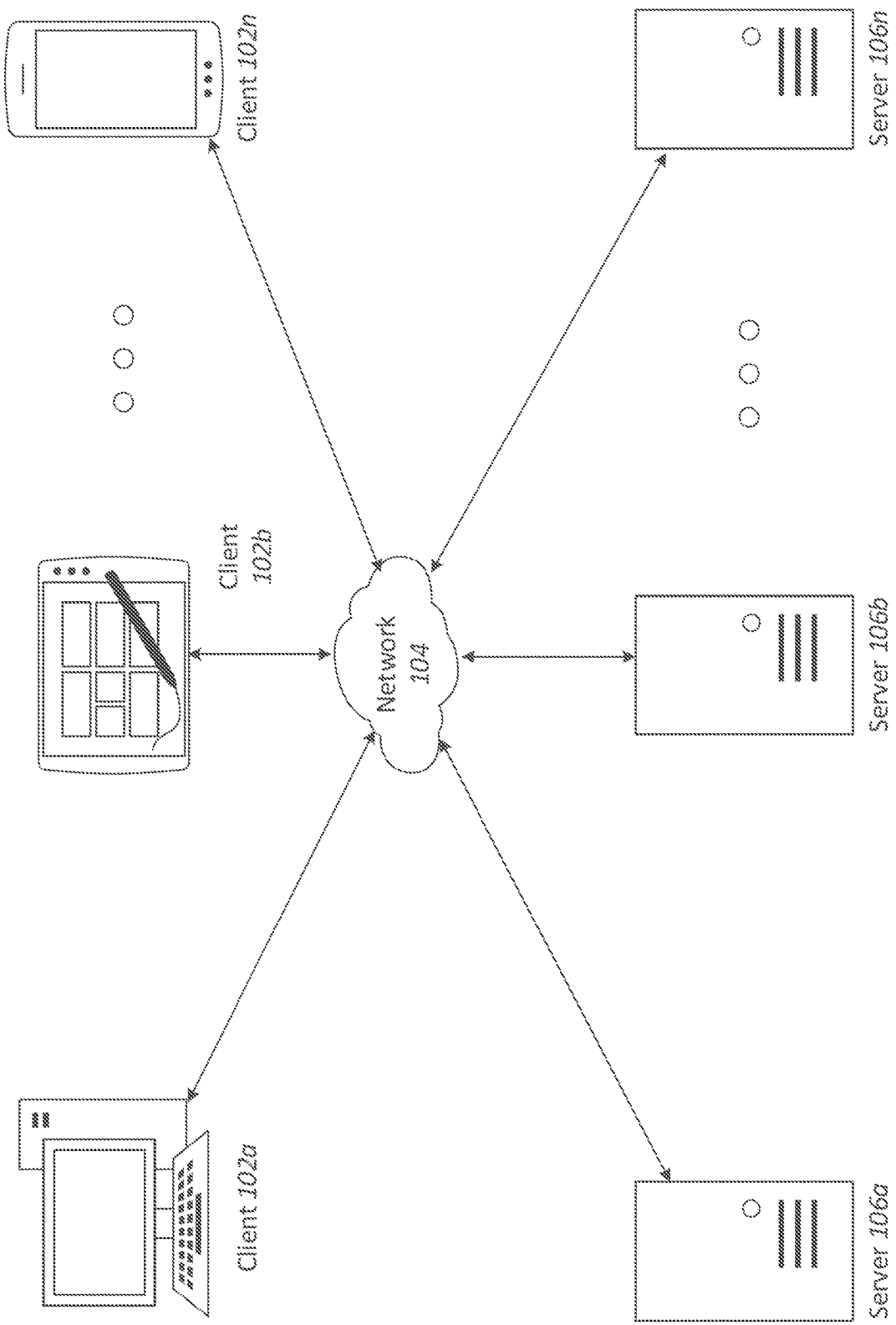
FIG. 1A is a block diagram depicting an embodiment of a network environment comprising client device in communication with server device.

Prior to discussing specific embodiments of the present solution, it may be helpful to describe aspects of the operating environment as well as associated system components (e.g. hardware elements) in connection with the methods and systems described herein. Referring to FIG. 1A, an embodiment of a network environment is depicted. In a brief overview, the network environment includes one or more clients 102a-102n (also generally referred to as local machines(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node(s) 106, machine(s) 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' may be a public network. In still another of these embodiments, networks 104 and 104' may both be private networks.

The network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-NRTT, CDMA-EVDO, LTE, LTE-Advanced, LTE-M1, and Narrowband IoT (NB-IoT). Wireless standards may use various channel access methods, e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv6), or the link layer. The network 104 may be a type of broadcast network, a telecommunications network, a data communication network, or a computer network.

In some embodiments, the system may include multiple, logically-grouped servers 106. In one of these embodiments, the logical group of servers may be referred to as a server farm or a machine farm. In another of these embodiments, the servers 106 may be geographically dispersed. In other embodiments, a machine farm may be administered as a single entity. In still other embodiments, the machine farm includes a plurality of machine farms. The servers 106 within each machine farm can be heterogeneous—one or more of the servers 106 or machines 106 can operate according to one type of operating system platform (e.g., Windows, manufactured by Microsoft Corp. of Redmond, Wash.), while one or more of the other servers 106 can operate according to another type of operating system platform (e.g., Unix, Linux, or Mac OSX).

In one embodiment, servers 106 in the machine farm may be stored in high-density rack systems, along with associated storage systems, and located in an enterprise data center. In this embodiment, consolidating the servers 106 in this way may improve system manageability, data security, the physical security of the system, and system performance by locating servers 106 and high-performance storage systems on localized high-performance networks. Centralizing the servers 106 and storage systems and coupling them with advanced system management tools allows more efficient use of server resources.

The servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm can be increased if the servers 106 are connected using a local-area network (LAN) connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc. of Fort Lauderdale, Florida; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, California.

Management of the machine farm may be de-centralized. For example, one or more servers 106 may comprise components, subsystems and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, a plurality of servers 106 may be in the path between any two communicating servers 106.

Figure 1B:
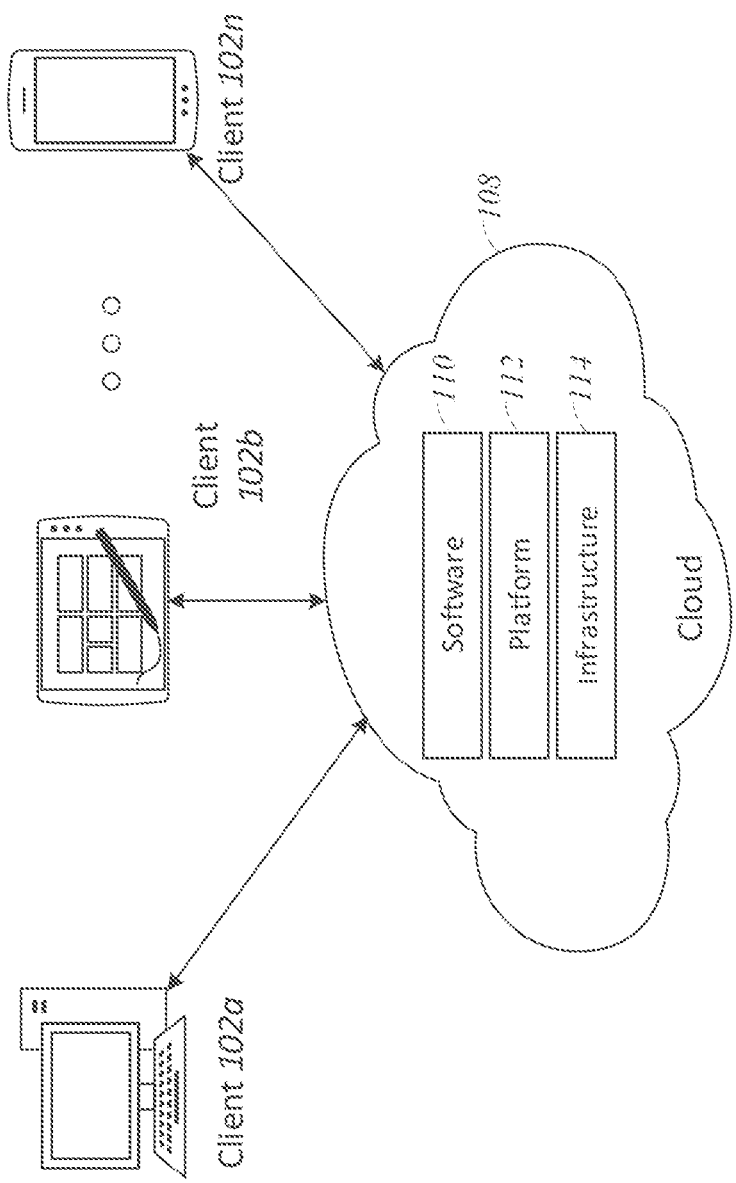
FIG. 1B is a block diagram depicting a could computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102*a*-102*n*, in communication with the cloud 108 over one or more networks 104. Clients 102 may include, e.g., thick clients, thin clients, and zero clients. A thick client may provide at least some functionality even when disconnected from the cloud 108 or servers 106. A thin client or zero client may depend on the connection to the cloud 108 or server 106 to provide functionality. A zero client may depend on the cloud 108 or other networks 104 or servers 106 to retrieve operating system data for the client device 102. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 109 may include both the private and public networks 104 and servers 106.

The cloud 108 may also include a cloud-based delivery, e.g. Software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers or virtualization resources from large pools, allowing the users to quickly scale up by accessing more resources as needed. Examples of IaaS include Amazon Web Services (AWS) provided by Amazon, Inc. of Seattle, Washington, Rackspace Cloud provided by Rackspace Inc. of San Antonio, Texas, Google Compute Engine provided by Google Inc. of Mountain View, California, or RightScale provided by RightScale, Inc. of Santa Barbara, California. PaaS providers may offer functionality provided by IaaS, including, e.g., storage, networking, servers or virtualization, as well as additional resources, e.g., the operating system, middleware, or runtime resources. Examples of PaaS include Windows Azure provided by Microsoft Corporation of Redmond, Washington, Google App Engine provided by Google Inc., and Heroku provided by Heroku, Inc. of San Francisco California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, California, or Office365 provided by Microsoft Corporation. Examples of SaaS may also include storage providers, e.g. Dropbox provided by Dropbox Inc. of San Francisco, California, Microsoft OneDrive provided by Microsoft Corporation, Google Drive provided by Google Inc., or Apple iCloud provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. Google Chrome, Microsoft Internet Explorer, or Mozilla Firefox provided by Mozilla Foundation of Mountain View, California). Clients 102 may also access SaaS resources through smartphone or tablet applications, including e.g., Salesforce Sales Cloud, or Google Drive App. Clients 102 may also access SaaS resources through the client operating system, including e.g. Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

The client 102 and server 106 may be deployed as and/or executed on any type and form of computing device, e.g., a computer, network device or appliance capable of communicating on any type and form of network and performing the operations described herein.

Figure 1C:
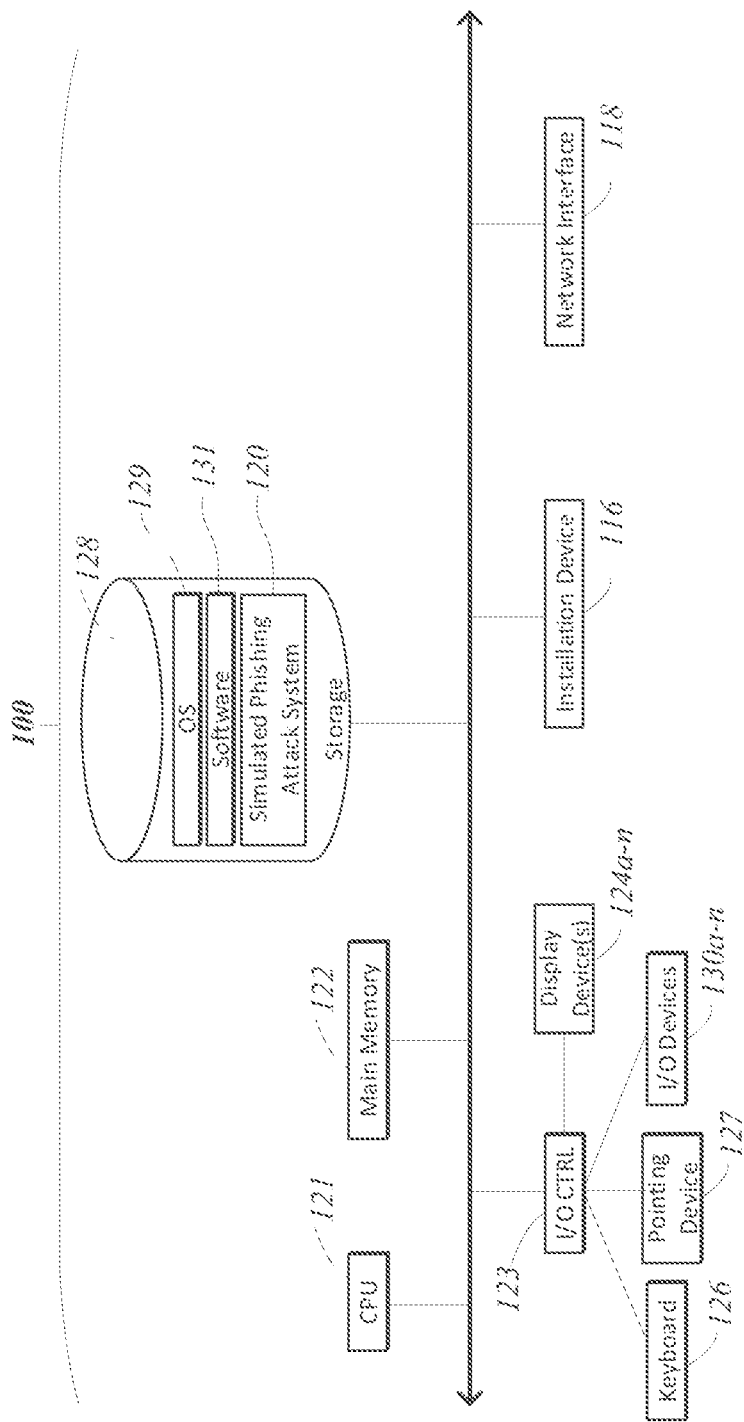
FIGS. 1C and 1D are block diagrams depicting embodiments of computing devices useful in connection with the methods and systems described herein.
Figure 1D:
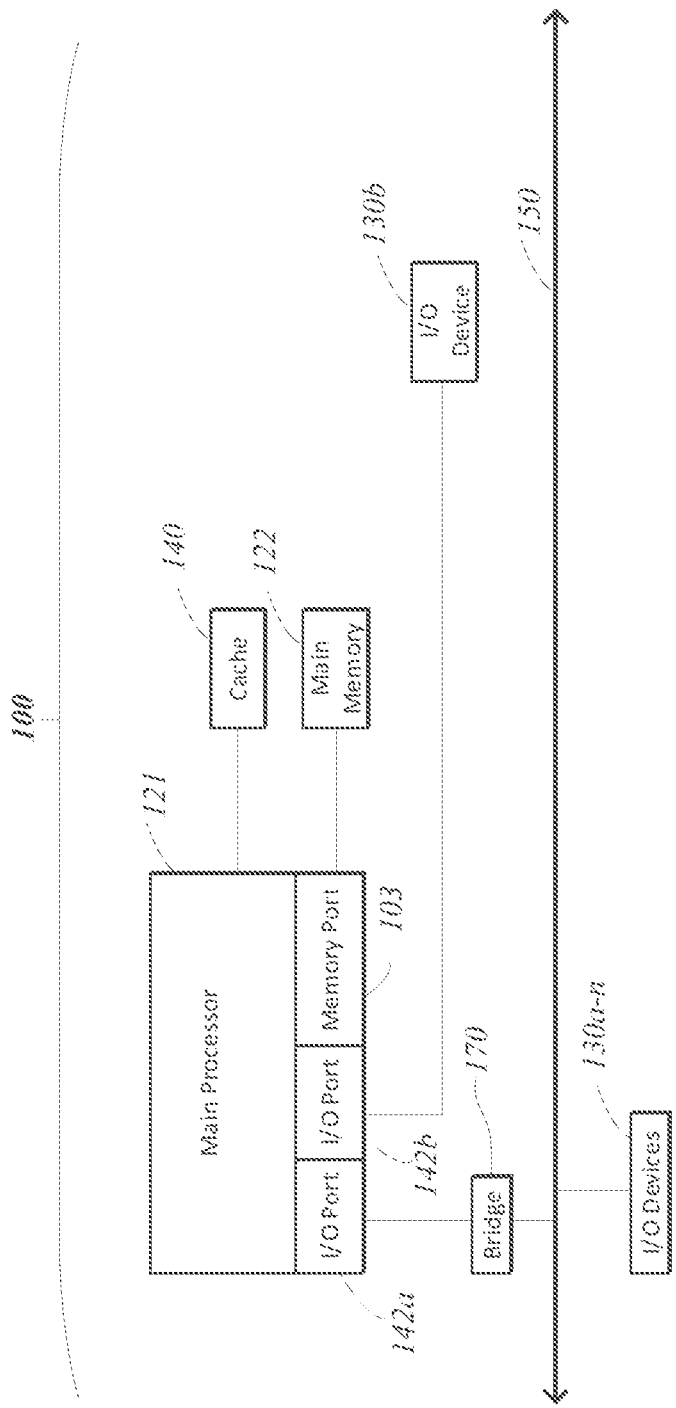

FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, and I/O controller 123, display devices 124a-124n, a keyboard 126 and a pointing device 127, e.g., a mouse. The storage device 128 may include, without limitation, an operating system 129, software 131, and a software of a simulated phishing attack system 120. As shown in FIG. 1D, each computing device 100 may also include additional optional elements, e.g., a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTER CORE i5 and INTEL CORE i7.

Main memory unit 122 may include on or more memory chips capable of storing data and allowing any storage location to be directly accessed by the microprocessor 121. Main memory unit 122 may be volatile and faster than storage 128 memory. Main memory units 122 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts and embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphic Port (AGP) to communicate with the display 124 or the I/O controller 123 for the display 124. FIG. 1D depicts and embodiment of a computer 100 in which the main processor 121 communicates directly with I/O device 130b or other processors 121' via HYPER-TRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple iPhone. Some devices 130a-130n allow gesture recognition inputs through combining some of the inputs and outputs. Some devices 130a-130n provide for facial recognition which may be utilized as an input for different purposes including authentication and other commands. Some devices 130a-130n provide for voice recognition and inputs, including, e.g., Microsoft KINECT, SIRI for iPhone by Apple, Google Now or Google Voice Search, and Alexa by Amazon.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, a I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or auto stereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116 and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, WINDOWS 8 and WINDOW 10, all of which are manufactured by Microsoft Corporation of Redmond, Wash.; MAC OS and iOS, manufactured by Apple, Inc.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, or a NINTENDO DS, NINTENDO 3DS, NINTENDO WII, or a NINTENDO WII U device manufactured by Nintendo Co., Ltd., of Kyoto, Japan, or an XBOX 360 device manufactured by Microsoft Corporation.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Washington. In other embodiments, the computing device 100 is an eBook reader, e.g. the KINDLE family of devices by Amazon.com, or NOOK family of devices by Barnes & Noble, Inc. of New York City, New York.

In some embodiments, the communications device 102 includes a combination of devices, e.g. a smartphone combined with a digital audio player or portable media player. For example, one of these embodiments is a smartphone, e.g. the iPhone family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Security Awareness Training Systems and Methods

The following describes systems and methods of creating, controlling and executing security awareness training campaigns that utilized breached password information to minimize ongoing risk to an organization from user behaviors which magnify the severity of a breached or compromised password.

A system can be configured to send simulated phishing emails, text messages, phone calls (e.g. via VoIP), video and Internet based communications, all which may be referred to as "electronic training" or simply "training". The system may vary the quantity, frequency, type, sophistication, content, timing, and combination of training. A set of training emails, text messages, phone calls, video and/or Internet based communications ("electronic training content") sent to one or more users may be referred to as a training campaign. In some implementations, some or all of the electronic training content in a training campaign may be used to inform a user or group of users about risks and/or best practices for a particular subject. In some examples, all of the electronic training content in a training campaign relates to one particular subject. In embodiments, all of the electronic training content in a training campaign relates to more than one subject in a group of subjects with a common theme. In some implementations, traditional training content, such as posters, handouts, flyers, group seminars, and the like, may be provided in addition or as a complement to electronic training content.

A training campaign may be intended to lure the user to perform an action that is considered a risk to an IT system, in order to create a teachable moment where the user can be shown how their action can compromise the system. In some implementations, electronic training content can be configured to look like genuine messages from internal IT systems, external platforms, or other trusted senders in an attempt to lure the user to interact with it. In some implementations, electronic training content of a training campaign may be intended to lure the user to provide personal information such as user names, passwords, identification numbers, account numbers, or to change their password. The desired user response is referred to as the 'action', or the 'requested action', or the 'desired action'. If the user performs the requested action, then the system can respond with training, which may be called "remedial training".

In some implementations, the system may adaptively learn the best method (e.g., set of steps) and/or the best combination of electronic content to get the user to perform the requested action, such as providing a username and password or changing their password. The learning process implemented by the system can be trained by observing the behavior of other users in the same company or in the same industry, by observing the behavior of all other users of the system, or by observing the behavior of a subset of other users in the system based on one or more attributes of the subset of other users meeting one or more selected criteria.

The system can record when and how the requested action was performed and can produce reports about the requested actions. In particular, if the requested action is for the user to change their password, the system can record the old password and the new password and examine the new password, on its own or in light of the old password, to determine if the changed password meets best practices. Where the electronic training content was sent to multiple users, in some examples the system can track whether more than one user changed their password to the same password, or similar passwords.

In some implementations, the system may provide training on why a user should not have performed a requested action at the time that the user performs the requested action. In some implementations, the system may add users that performed requested actions to specific user groups that are scheduled to receive general or targeted remedial training at some time in the future. In some implementations, the system may assign a user attribute to a user that performed the requested action, and the user attributes may be used to create query-based groups for future training campaigns. In embodiments, the user may be prevented from using their IT systems in a normal operational mode until the user completes remedial training.

A security awareness system may keep logs from previous training campaigns, including all actions performed on a user and all user actions performed, which may in some examples be used to inform future campaigns. A security awareness system may further use information from event logs, for example Windows event logs, as well as learning management system (LMS) analysis, which may inform the security awareness system what training a user has had, where the user performed well and where the user struggled with the training that the user completed, and what the user should know. A security awareness system may use information from company profiling activities, for example email exposure check results, applications used, software as a service (SaaS) services used, etc. A security awareness system may use information from industry profiles corresponding to an industry that a user's company is associated with.

In some embodiments, a security awareness system is capable of performing risk analysis of users, groups of users, or a company. For example, a security awareness system may be able to perform a risk profile of a user with respect to password usage. In some embodiments, a security awareness system can track events in a company and/or for a user in a company to identify one or more risk points, for example, in some embodiments, a system can track information that a given user is exposed to, in order to identify a risk point. For example, employees in a company that regularly deal with wire transfers may be likely to be at a higher risk for wire transfer fraud, and people that are exposed to sensitive information may be at a higher risk for leaking intellectual property. In examples, a system can track the presence of a user's account information in an external breached password database.

In some embodiments, a security awareness system training campaign duration is limited to a fixed period of time, for example a fixed number of days. In some embodiments, a security awareness training campaign will terminate once a certain percentage of users fail the campaign, for example in a fixed period of time. In some embodiments, a security awareness training campaign stops when a certain percentage of users demonstrate compliance with one or more IT policies or procedures.

Figure 2A:
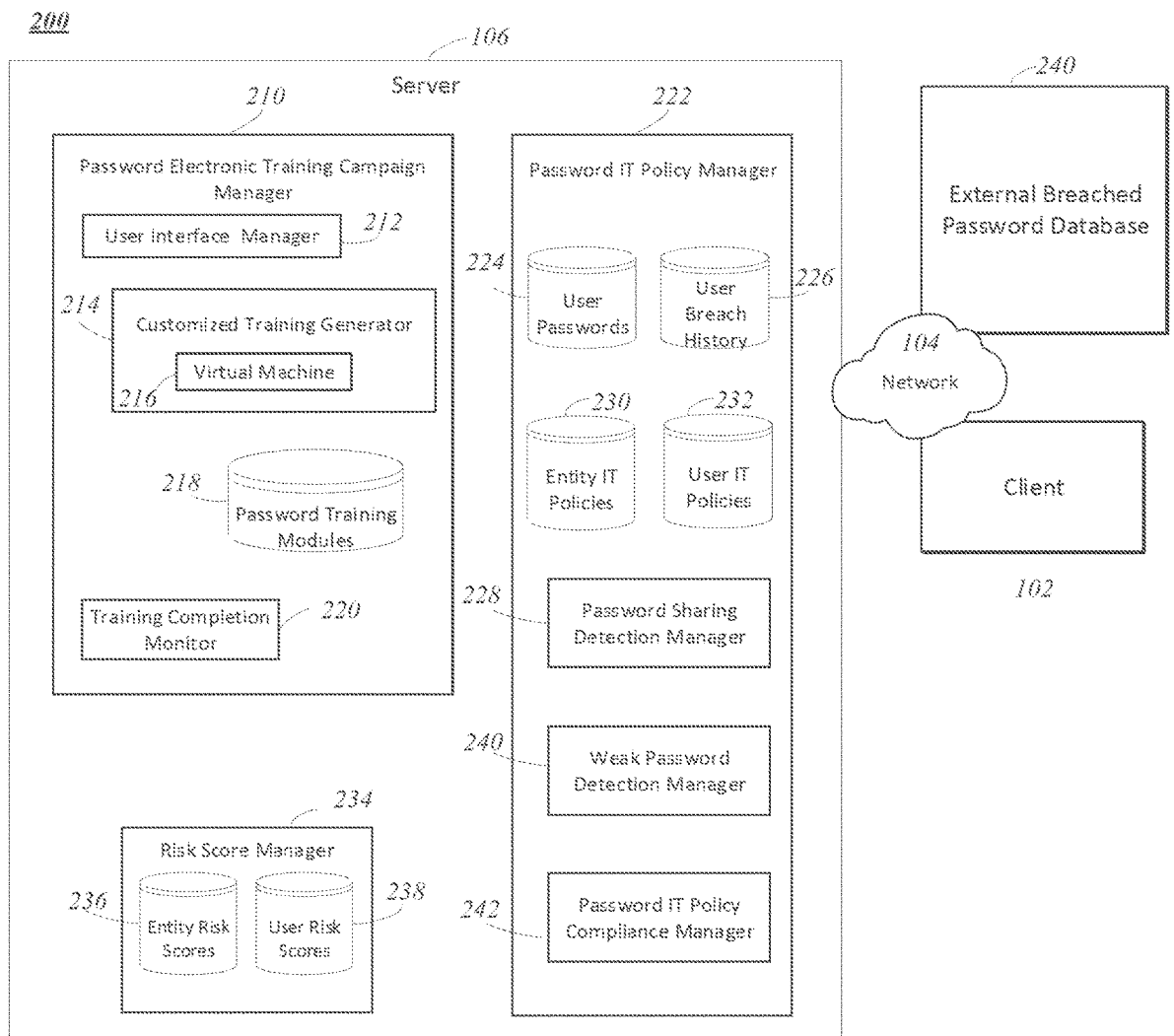
FIG. 2A depicts an implementation of some of the server architecture of an implementation of a system capable of using breached password information to train users, according to some embodiments.

Referring to FIG. 2A in a general overview, FIG. 2A depicts some of the server architecture of an implementation of a system 200 capable of creating, controlling and executing electronic campaigns, setting password IT policies, and creating, controlling and utilizing risk scores with based on password usage. In some implementations, system 200 includes server 106 and client 102 and network 104 allowing communication between these system components. Server 106 may include password electronic training campaign manager 210, password IT policy manager 222, and risk score manager 234. Password electronic training campaign manager 210 may include user interface manager 212, customized training generator 214, which may include virtual machine 216. In some implementations, system 200 may include training completion monitor 220, and storage for password training modules 218. Password IT policy manager 222 may include password sharing detection manager 228, weak password detection manager 240, and password IT policy compliance manager 242. In some embodiments, password IT policy manager 222 may include entity IT policies storage 230 and/or user IT policies storage 232.

In some implementations, system 200 includes risk score manager 234, which may include entity risk score storage 246 and/or user risk scores storage 238. System 200 may include one or more external breached password databases 240, which server 106 and client 102 can communicate with over network 104.

Referring again to FIG. 2A in more detail, password electronic training campaign manager 210 generally manages the process of curating, sending, and analyzing one or more training campaigns to train users about secure password usage. Password electronic training campaign manager 210 may communicate with one or more external breached password databases 240, for example those available on the "dark web". Examples of external breached password services that use such databases include "Have I Been Pwned" (Troy Hunt), which curates data based on breaches where personal data is exposed to persons who should not have been able to view it. In other examples, password breach data from external databases such as "Have I Been Pwned" is integrated into the IT system via an API service which can be accessed over network 104.

In examples, password electronic training campaign manager 210 includes customized training generator 214, which may be implemented as or contain virtual machine 216. In examples, customized training generator 214 is operable to integrate information from one or more of password IT policy manager 222, external breached password database 240, client 102, and risk score manager 234, to generate training campaigns related to password usage. In some examples, customized training generator 214 may generated training campaigns that are specific to a single user. In examples, customized training manager generates training campaigns that are applicable to multiple users, groups of users, or users associated with an entity. Password electronic training campaign manager 210 may include user interface manager 212. In some examples, responsive to a user input, password electronic training campaign manager 210 generates a training campaign, including one or more password training modules from password training modules storage 218. In some examples, password electronic training campaign manager 210 generates a training campaign, including one or more password training modules from password training modules storage 218, responsive to one or more inputs from risk score manager 234, password IT policy manager 222, and/or client 102. For example, password electronic training campaign manager 210 may generate a training campaign for a user responsive to a change in a user risk score from risk score manager 234. In examples, password electronic training campaign manager 210 may generate a training campaign for users associated with an entity responsive to a change in an entity risk score from risk score manager 234. In examples, password electronic training campaign manager 210 may generate a training campaign for users and/or for an entity responsive to a user or a user's password appearing in external breached password database 240. a change in an entity risk score from risk score manager 234.

The password electronic training campaign manager 210 may manage various aspects of an electronic training campaign. For example, the password electronic training campaign manager 210 may process input from server 106 and/or may provide access as needed to various applications, modules, and other software components of server 106 to other various applications, modules, and other software components of server 106. The password electronic training campaign manager 210 may monitor and control timing of various aspects of a training campaign, may process requests for access to training campaign results, and/or may perform other tasks related to the management of a password training campaign.

In some embodiments, the password electronic training campaign manager 210 may be integrated with or coupled to memory 122. In some embodiments, memory 122 may include any type and form of storage, such as a database or file system. Memory 122 may store data such as parameters and scripts corresponding to the choices made by server 106 through password electronic training campaign manager 210, e.g. as described above for a particular training campaign.

In an implementation, the password electronic training campaign manager 210 includes a simulated customized training generator 214. Customized training generator 214 may be integrated with or coupled to memory 122, so as to provide the customized training generator 214 access to parameters associated with messaging choices made for a particular training campaign by e.g. the server 106. Customized training generator 214 may be integrated with or coupled to memory or a memory store or otherwise a storage, such as a database, containing password training modules 218. Customized training generator 214 may be an application, service, daemon, routine, or other executable logic for generating training. The training generated by customized training generator 214 may be of any appropriate format. For example, they may be email messages, text or SMS messages, messages used by particular messaging applications such as, e.g. WhatsApp™ (Facebook, Menlo Park, California), or any other type of message. They may be videos, documents, interactive games, interactive chats, or other content types to be used in a particular training campaign selected by e.g. server 106 using password electronic training campaign manager 210. Messages and/or content may be generated in any appropriate manner, e.g. by running an instance of an application that generates the desired message type, such as running e.g. a Gmail™ application (Google, Mountain View, California), Microsoft Outlook™ (Microsoft, Redmond, Washington), a text messaging application, or any other appropriate application. The messages may be generated by running a messaging application on e.g. virtual machine 216 or may simply be run on an operating system of server 106 or may be run in any other appropriate environment. The messages may be generated to be formatted consistent with specific messaging platforms, for example Outlook 365 (Microsoft, Redmond, Washington), Outlook Web Access (OWA) (Microsoft, Redmond, Washington), Webmail, iOS (Apple, Cupertino, California), Gmail client (Google, Mountain View, California), and so on.

In some embodiments, the customized training generator 214 can be configured to generate messages having the ability to traverse users who interact with the messages to a specific landing page to provide further training.

In some embodiments, customized training generator 214 can be configured to generate a simulated phishing email which tests one or more password IT policies. The email can appear to be delivered from a trusted email address, such as the email address of an executive of the company at which the targeted user is employed. In addition, the email can have a "Subject:" field that is intended to cause the user to take an action, such as sending their password or credentials or changing their password. In some embodiments, customized training generator 214 can generate one or more simulated phishing emails which are stored in the password training modules storage 218. In some embodiments, customized training generator 214 can generate multiple instances of the email which may be delivered to multiple users, such as a subset of all of the employees of the company. In some embodiments, customized training generator 214 can generate multiple instances of the email which may be delivered to a user group. For example, server 106 can select any number of employees who should be targeted by a simulated password training test, can create a user group and store this user group in memory 122. Customized training generator 214 can retrieve this information from memory 122 and can generate a set of emails similar to the email, each addressed to a respective target identified in the information stored in the memory 122. That is, customized training generator 214 can generate the emails such that the "From:" and "Subject:" fields of each email are identical, while the "To:" field is adjusted according to the desired targets.

In an implementation, password electronic training campaign manager 210 may be e.g., another name for a system administrator, such as a security manager, a third-party security consultant, a risk assessor, or any other party that uses the password electronic training campaign manager 210 installed on a server. Server 106 may wish to direct a simulated password training test by interacting with the password electronic training campaign manager 210 installed on the server. The password electronic training campaign manager 210 may be, for example, a desktop computer, a laptop computer, a mobile device, or any other suitable computing device. The password electronic training campaign manager 210 may be e.g., an application on a device that allows for a user of the device to interact with server 106 for e.g. purposes of creating, configuring, tailoring and/or executing a simulated password training test and/or viewing and/or processing and/or analyzing the results of a simulated password training test.

In an implementation, password electronic training campaign manager 210, when executed, causes a graphical user interface to be displayed to server 106. In other embodiments, password electronic training campaign manager 210 allows for user input through a non-graphical user interface, such as a user interface that accepts text or vocal input without displaying an interactive image. A graphical user interface may be displayed on a screen of a mobile phone, or a monitor connected to a desktop or laptop computer or may be displayed on any other display. The user may interact with e.g. the graphical user interface on the device by typing, clicking a mouse, tapping, speaking, or any other method of interacting with a user interface. The graphical user interface on the device may be a web-based user interface provided by a web browser (e.g. Google Chrome (Google, Mountain View, California), Microsoft Internet Explorer (Microsoft, Redmond, Washington), or Mozilla Firefox (Mozilla Foundation of Mountain View, California), or may be an application installed on a user device capable of opening a network connection to password electronic training campaign manager 210 or may be any other type of interface.

In an implementation, password electronic training campaign manager 210 and/or server 106 may make choices concerning how password training is to be carried out. For example, a graphical user interface run by password electronic training campaign manager 210 may be displayed to server 106. An administrator, via server 106, may input parameters for the training that affect how it will be carried out. For example, via server 106 an administrator may make choices as to which users to include as potential recipients of the training, the method of determining which users are to be selected as potential recipients of the training, the timing of various aspects of the training, whether to use a training module that includes values for one or a plurality of password failure indicators, how responses from targeted users should be uniquely identified, and other choices. These choices may be made by selecting options displayed on a graphical user interface from dropdown menus, being presented with choices through a training wizard, or in any other appropriate manner.

In an implementation, the password electronic training campaign manager 210 may allow server 106, such as via application programming interfaces (APIs), to access and/or change settings of an account maintained with any party involved with the training, such as, for example, a third party security service provider, or may allow server 106 to access and/or change settings of an account maintained with a third party security service provider, such as one that e.g. manages an exploit server, view bills and/or make payments to a third party security service provider, to perform these functions with other third parties involved in the training, or provide any other functions that would be appropriate for facilitating communications between server 106 and any other parties involved in the training.

The server 106 may include risk score manager 234. Risk score manager 234 may process input from server 106 and/or may provide access as needed to various applications, modules, and other software components of server 106 to other various applications, modules, and other software components of server 106. Risk score manager 234 may monitor and control inputs and various other system aspects which would lead to the adjustment of user or entity risk scores, for example in response to updated information in external breached password database 240, or inputs from password sharing detection manager 228, weak password detection manager 240, password IT policy compliance manager 242, and/or training completion monitor 220. Risk score manager 234 may update user risk scores in user risk scores storage 238, and/or entity risk scores in entity risk scores storage 236, in response to completion of one or more training modules and/or training campaigns and may process requests for access to risk scores and/or may perform other tasks related to the management of risk scores for users and/or entities. In some embodiments, risk score manager 234 may be integrated with or coupled to memory 122. In some embodiments, the memory may include any type and form of storage, such as a database or file system. Memory 122 may store data such as parameters and scripts corresponding to the choices made by server 106 through risk score manager 234, e.g. as described above for a particular training campaign.

The user and/or entity risk scores may include a reference identifiers and/or time stamps, which enable risk score manager 234 to track risk scores over time. The reference identifier for a user and/or entity may be integrated with or coupled to memory or a memory store or otherwise a storage, such as a database, containing reference identifiers. The reference identifier may be an application, service, daemon, routine, or other executable logic for recognizing reference identifiers and associating reference identifiers with a particular user or entity. When the system provides training to a user, the training may include the user's reference identifier in the metadata of the training, which may be used by system 200 to track the details and timing of the delivery and completion of training provided to the user. In some examples, password IT policy manager 222 and/or password electronic training campaign manager 210 may use a reference identifier to make inquiries, respond to inquiries, and generate reports for a user or group of users. Password electronic training campaign manager may alert password IT policy manager 222 when a user, or a group of users, has failed the password security awareness training. In some embodiments, the reference identifier may be used in alerts and notifications to identify a particular user.

Password electronic training campaign manager 210, password IT policy manager 222, and risk score manager 234 may be an application, service, daemon, routine, or other executable logic.

Server 106 may include password IT policy manager 222. Password IT policy manager 222 may process input from server 106 and/or may provide access as needed to various applications, modules, and other software components of server 106 to other various applications, modules, and other software components of server 106. Password IT policy manager 222 may monitor and control password IT policies for users, groups of users, and/or entities when a user or a user's password appears in an external breached password database 240, and/or when a user successfully completes password electronic training. In some embodiments, password IT policy manager 222 may be integrated with or coupled to memory 122. In some embodiments, the memory may include any type and form of storage, such as a database or file system. The memory 122 may store data such as parameters and scripts corresponding to the choices made by a server 106 through a password IT policy manager 222, e.g. as described above for a particular password breach or password training.

Password IT policy manager 222 may include user passwords storage 224. In some examples, user passwords storage 224 includes the most recent passwords of all users in the organization. In some examples, user passwords storage 224 includes a history record one or more passwords for each user in the organization. User passwords stored in user passwords storage 224 may be structured in one or more records, where each record corresponds to a given user and each record comprises all of the passwords the user has used at the organization. In some examples, user passwords in user passwords storage may be stored in records where each record consists of more than one field, for example the records may concatenate one or more of "user", "password", "date set", "date changed", "device used", "prompted yes/no", etc. Passwords stored in user passwords storage 224 may be stored as a hash, such as a SHA-1 hash of a UTF-8 encoded password.

Password IT policy manager 222 may include user breach history storage 226. Password IT policy manager 222 may interact with external breached password database 240 through network 104. In some examples, password IT policy manager 222 may access external breached password database 240 through an API, in some examples using one or more search terms. In examples, the API is used to return a list of all breaches that a particular account has been involved in. In embodiments, the API takes a single parameter from password IT policy manager 222, which in some examples is the account to be searched for in URL encoded format. In some embodiments, password IT policy manager 222 may search external breached password database 240 using one or more domain names. In some embodiments, password IT policy manager 222 may subscribe to be notified of any future breaches of accounts on one or more domains. External breached password database 222 may utilize data classes, which are attributes of records compromised in a breach. Examples of data classes are "email addresses" and "passwords". Other attributes may include "domain", "breach date and time", "added date and time", "modified date and time".

In examples, password IT policy manager 222 may subscribe to an RSS feed associated with external breached password database 240. In some examples, password IT policy manager 222 may provide one or more user passwords to external breached password database, in some cases in plain text and in some cases hashed or encrypted, in order to determine if the one or more user passwords has been compromised. Details related to user breaches are stored in user breach history storage 226.

Password IT policy manager 222 may include password sharing detection manager 228. In some examples, password sharing detection manager 228 accesses user passwords from user passwords storage 224. In embodiments, password sharing detection manager 228 is configured to detect the same password across one or more users. In examples, password sharing detection manager 228 is configured to detect concurrent use of the same password across one or more users. In some examples, password sharing detection manager 228 is configured to detect the use of the same password across one or more users over time. For example, user A used password "password1" a year ago but no longer uses it now, and user B used password "password1" two years ago but no longer uses it now, and user C uses "password1" now. In embodiments, password sharing detection manager may create an entity IT policy to be stored in entity IT policies storage 230 or a user IT policy to be stored in user IT policies storage 232, which may, for example, prevent a user from setting a specific password such as "password1", or may prevent a user from setting a password that is being used by another user, or has been used by another user in the past period of time, or has been used by another user at any time in the past. In embodiments, password sharing detection manager 228 communicates instances of determined password sharing to risk score manager 234, which may, in some examples, modify user risk scores and/or entity risk scores. In embodiments, password sharing detection manager 228 communicates instances of determined password sharing to password electronic training campaign manager 210, which may, in some examples, provide remedial training or queue on or more users to take remedial training at a future time.

In some examples, password IT policy manager 222 may include weak password detection manager 240. In embodiments, weak password detection manager uses IT policies, for example IT policies stored in entity IT policies storage 230 and/or IT policies stored in user IT policies 232 to look for weak password use by users or by entities. In some examples, weak password detection manager uses rules for weak passwords that are input by an administrator. In embodiments, password IT policy manager 222 runs weak password tests based on one or more rules for weak passwords against user passwords stored in user passwords storage 224. In embodiments, password IT policy manager 222 runs weak password tests based on one or more rules for weak passwords against user passwords stored in an active directory domain. In embodiments, weak password detection manager 228 communicates instances of weak passwords to risk score manager 234, which may, in some examples, modify user risk scores and/or entity risk scores. In embodiments, weak password detection manager 228 communicates instances of weak passwords to password electronic training campaign manager 210, which may, in some examples, provide remedial training or queue one or more users to take remedial training at a future time.

In some examples, password IT policy manager 222 may include password IT policy compliance manager 242. In embodiments, password IT policy compliance manager 242 screens user passwords when they are set and/or changed to ensure that the passwords meet user IT policies and/or entity IT policies. In some examples, password IT policy compliance manger 242 indicates to password electronic training campaign manager 210 if a user attempts to set a password which is not compliant to user IT policies and/or entity IT policies, such that password electronic training campaign manager may provide remedial training to the one or more users that attempted to set passwords that are not compliant with IT policies.

In some examples the password electronic training campaign manager 210 may indicate to the password IT policy manager 222 an increase in the number of users being recommended for training. This may indicate that the number users that have been victim to a password breach is increasing. In some examples the password electronic training campaign manager 210 may indicate to password IT policy manager 222 that a revision of the IT policy is appropriate. In some embodiments, a system administrator is notified that a revision of a user IT policy or an entity IT policy is appropriate. The system administrator, via password IT policy manager 222, may update one or more of a user IT policy and/or and entity IT policy. In some examples when a user IT policy and/or an entity IT policy is created or modified, password IT policy manager 222 may inform password electronic training campaign manager 210. Responsive to receiving notification of changed IT policies, password electronic training campaign manager 210 may initiate one or more training campaigns to train one or more users or groups of users about the new IT policy. In some examples, when user IT policies and/or entity IT policies are updated, password IT policy compliance manager may check all existing user passwords against the new policies, looking for any passwords which may have met previous policies but no longer meet current policies, and may prompt the one or more users to select a new password. Password IT policy compliance manager may check any updated password that a user tries to set to determine if that password has been part of a breach and cause client 102 to reject the updated password.

Server 106 may include risk score manager 234. A risk score is a representation of a user or group of users vulnerability to a malicious attack. In some examples, risk score manager 234 calculates one or more risk scores based on training history, phishing history, responses to simulated phishing tests, demographic information, information about the organization, password breach data, and data which may be obtained from a Security Information Management (SIM) service. In some embodiments, a risk score framework is created, which outlines the data that is considered in creating the risk score such as the frequency a user receives phishing attacks, the severity of those attacks, and the method of calculating the risk score. In some embodiments, a variety of data sources may be incorporated. In some examples, records reflecting user password use may be incorporated. The sophistication of the user's choice of passwords and how strong their passwords are may be integrated. In some examples, an indication of how different passwords that a user has used over time may be included in the risk score. In some examples, input from password sharing detection manager 228 with respect to whether or not the user has ever used the same password as someone else, in integrated into the determination of the risk score. In embodiments, input from weak password detection manager 240 with respect to whether or not the user has ever tried to use a weak password is integrated into the determination of the risk score. In some embodiments, the user's compliance to IT policies, as determined by password IT policy compliance manager 242, is incorporated into user risk scores 238 by the risk score manager 234. In examples, aggregate information about one or more users who share the same organization may be used to determine entity risk scores.

In embodiments, user training records are integrated from training completion monitor 220 as a source of information used in the creation of user risk scores 238 and/or entity risk scores 236. For example, the training that the user has completed, the time spent engaged in training activities, the duration of the training modules that the user has completed, and other details related to training or learning about password use and password breaches is incorporated by risk score manager 234 in risk user risk scores 238 and entity risk scores 236.

In some examples, weak password detection manager 240 uses IT policies, for example IT policies stored in entity IT policies storage 230 and/or IT policies stored in user IT policies 232 to look for weak password use by users or by entities. In some examples, weak password detection manager 240 uses rules for weak passwords that are input by an administrator. In embodiments, password IT policy manager 222 runs weak password tests based on one or more rules for weak passwords against user passwords stored in user passwords storage 224. In embodiments, password IT policy manager 222 runs weak password tests based on one or more rules for weak passwords against user passwords stored in an active directory domain. In embodiments, weak password detection manager 228 communicates instances of weak passwords to risk score manager 234, which may, in some examples, modify user risk scores and/or entity risk scores. In embodiments, weak password detection manager 228 communicates instances of weak passwords to password electronic training campaign manager 210, which may, in some examples, provide remedial training or queue one or more users to take remedial training at a future time.

In some embodiments, password electronic training manager 210 may send the user a link through a message directing the user to remedial training. In some examples, the user may be prevented from accessing some functions on a user device unless or until the user completes one or more remedial training modules. In some examples, the system may lock processes on the user's device and may generate a pop up which notifies the user that they need to complete remedial training. The remedial training may be part of the pop up that is displayed to the user on the user device. The pop up which may be displayed on the user device may include a link to a landing page where the user may access remedial training. In some examples, the training completion monitor 220 may track all the remedial training that is completed by the user, started and not completed by the user, and not started by the user.

Each of the server 106, password electronic training manager 210, user interface manager 212, customized training generator 214, training completion monitor 220, password IT policy manager 222, password sharing detection manager 228, weak password detection manager 240, password IT policy compliance manager 242 and risk score manager 234 may comprise a program, service, task, script, library, application or any type and form of executable instructions or code executable on one or more processors.

Any of the server 106, password electronic training manager 210, user interface manager 212, customized training generator 214, training completion monitor 220, password IT policy manager 222, password sharing detection manager 228, weak password detection manager 240, password IT policy compliance manager 242 and risk score manager 234 may be combined into one or more modules, applications, programs, services, tasks, scripts, libraries, applications, or executable code.

The server 106 may be a part of a cluster of servers 106. In some embodiments, tasks performed by server 106 may be performed by a plurality of servers. These tasks may be allocated among the plurality of servers by an application, service, daemon, routine, or other executable logic for task allocation. The server 106 may include a processor and memory. Some or all of server 106 may be hosted on cloud 108, for example by Amazon Web Services (AWS).

Figure 2B:
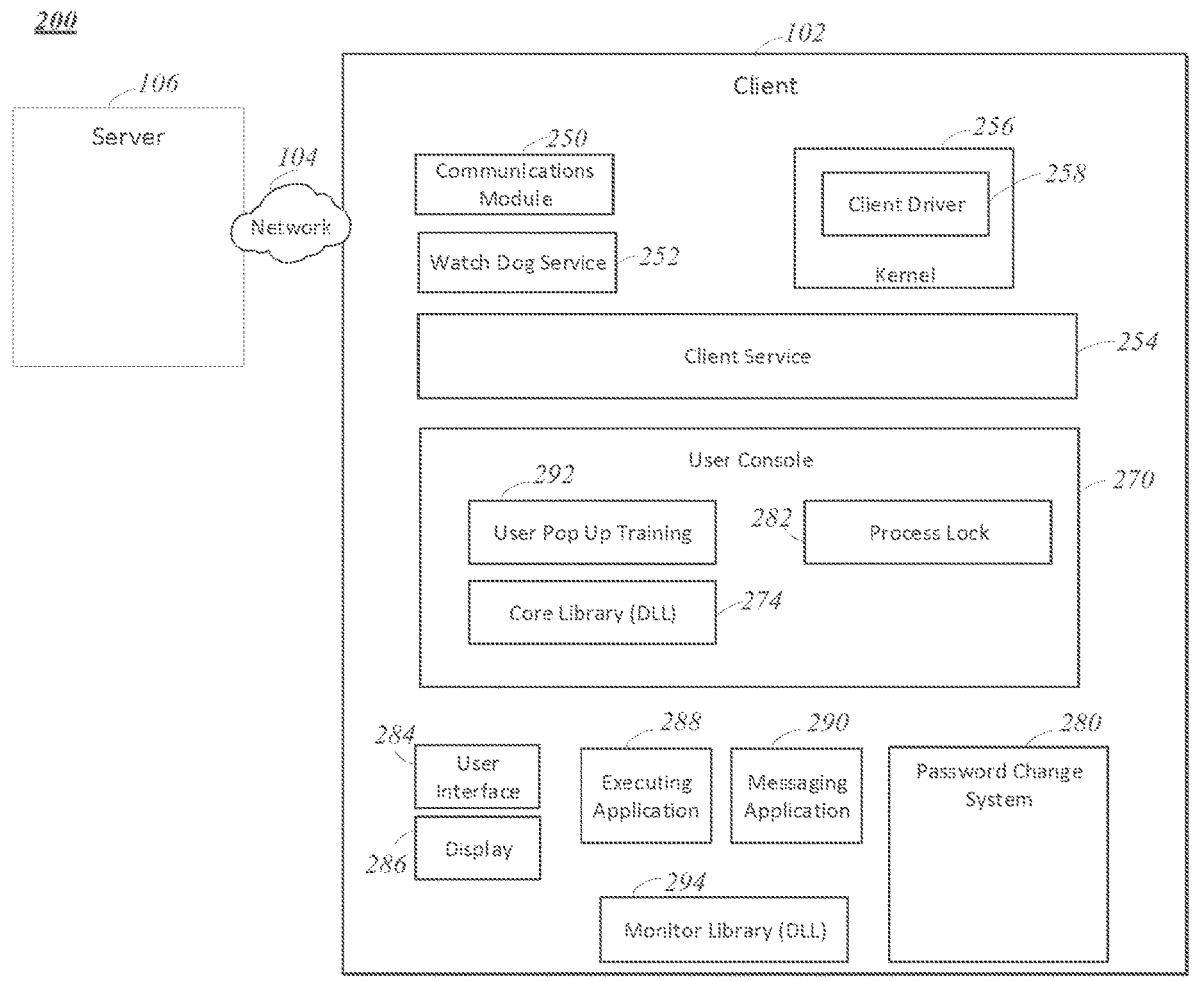
FIG. 2B depicts an implementation of some of the client architecture of an implementation of a system capable using breached password information to train users, according to some embodiments.

Referring to FIG. 2B, in a general overview, FIG. 2B depicts some of the client architecture of an implementation of a system 200 capable of creating, controlling and executing electronic campaigns, setting password IT policies, and creating, controlling and utilizing risk scores with based on password usage. The system 200 also includes the client 102. The client 102 may include a communications module 250, a watch dog service 252, and a client service 254. The client 102 may include a kernel 256 which may include a client driver 258. The client may include user console 270, which may include a core library (DLL) 274, a process lock 282, and user pop up training 292. The client may include one or more executing applications 288 and one or more messaging applications 290 and may include a monitor library (DLL) 294. The client may include user interface 284 and display 286. Client 102 may include a password change system 280.

Referring to FIG. 2B, in more detail, a client may be a victim of any data breach. For example, the client may be an employee, member, or independent contractor for an organization where the organization has employee names and employee email addresses stolen from where they are stored. Client 102 may be any device used by the client. The client does not need to own the device for it to be considered a client device 102. The client 102 may be any computing device, such as a desktop computer, a laptop, a mobile device, or any other computing device. In some embodiments, the client 102 may be a server or set of servers accessed by the client. For example, the client may be the employee or a member of an organization. The client may access a server that is e.g. owned or managed or otherwise associated with the organization. Such a server may be a client 102.

In some implementations, client 102 may include a communications module 250. This may be a library, application programming interface (API), a set of scripts, or any other code that may facilitate communications between the client 102 and any of the server 106, a third-party server, or any other server. In some embodiments, the communications module 250 determines when to transmit information from the client 102 to the external servers via a network 104. In some embodiments, the communications module 250 receives information from the server 106 via a network 104. In some embodiments, the information transmitted or received by the communications module 250 may correspond to a message, such as an email, generated or received by the messaging application 290.

The client 102 may include a client service 254. The client service 254 registers a client driver 258 into the operating system's kernel 256. The client driver 258 is designed to monitor certain processes within the operating system. The client service 254 ensures that client driver 258 is installed properly into the operating system. Once the client driver 258 is registered, the client service 254 waits for other critical startup programs to start (like winlogon.exe or explorer.exe in Windows), and then it starts a user console 270. The client service 254 also restarts the user console 270 should it crash or be terminated forcefully. The client service 254 is not associated with the user but is running in the background on the client all the time when started by the watch dog service 252. The client service 254 interacts with the user console 270 which runs in the user space allowing the system to pop up messages that target the user with dialogs. In some examples, if the user attempts to change their password to a password that does not comply with one or more password IT policies, the client service 254 may interact with the user console 270 to create a pop up for the user and to activate the process lock 282 such that the user cannot use any of the processes running on the client device. The client 102 may include user pop up training 292 which is provided via the user pop up created by the user console 270. The client service 254 also starts a user console 270 for every user that logs into a user profile. There may be several instances of the user console 270 for every logged in user. The client service 254 is a separate component that monitors and can in some instances control the user console 270 when initiated (e.g., initiate user pop up training 292, or temporarily pause execution of an application using the process lock 282, such as pausing execution of a web browser).

The user console 270 runs in the user space of the operating system. The user console raises prompts, get replies, and takes care of everything that needs to be done interactively with the user. The user console 270 is equipped with an internal library, the core library 274, which allows it to detect processes being created or terminated by the operating system. Whenever the OS creates a process, the user console detects it and may block the execution of the process using the process lock 282. The user console 270 can connect with the client service 254 for its settings.

In some examples, client 102 may include a watch dog service 252. The watch dog service 252 starts and monitors the client service 254. The watch dog service 252 may be launched as a delayed service. Several minutes after all the services start, the delayed services start running. When the watch dog service 252 starts up, it checks to see if the client service 254 is running. If this service is not running, then the watch dog service 252 starts this service. In another aspect, if an end user has advanced privileges and tries to kill the client services 252, the watch dog service 254 will see that the service is not running, and it will start it up again. In this way, the watch dog service 254 is a failsafe to ensure that the client service 254 is always running. The watch dog service 252 can also stop the client service 254 or stop and restart the client service 254.

In some embodiments, the client 102 may include a user interface 284 such as a keyboard, a mouse, a touch screen, or other appropriate user interface. This may be a user interface that is e.g. connected directly to a client 102, such as, for example, a keyboard connected to a mobile device, or may be connected indirectly to a client 102, such as, for example, a user interface of a client device used to access a server client 102. The client may include a display 286, such as a screen, a monitor connected to the device in any manner, or any other appropriate display.

In an implementation, the client 102 may include a messaging application 290. Messaging application 290 may be any application capable of viewing, editing, and/or sending messages. For example, messaging application 290 may be an instance of an application that allows viewing of a desired message type, such as any web browser, a Gmail™ application (Google, Mountain View, California), Microsoft Outlook™ (Microsoft, Mountain View, California), WhatsApp™ (Facebook, Menlo Park, California), a text messaging application, or any other appropriate application. In some embodiments, messaging application 290 can be configured to display password electronic training.

The client 102 may include password change system 280. Password change system 280 may be part of the user client, e.g. may be a process that runs on the user client 102. Password change system 280 may include user interface 278. Password change system user interface 278 allows a user to provide input via the password change system. In some examples, the user input via the password change system user interface 278 may be via a keyed entry, for example via a keypad on the device.

In some examples, client 102 receives password electronic training sent by server 106 based upon a password training campaign created by custom training generator 214 and executed by password electronic training campaign manager 210. Client 102 may receive the simulated phishing messages via messaging application 290, display the received messages for the user using display 286, and accept user interaction via user interface 284 responsive to the displayed message. In some embodiments, if the user does not comply with user IT policy or entity it policy, the client traverses on the client device to a landing page selected for the password electronic training campaign. The client 102 may lock processes on the client device until the user completes the electronic training campaign.

Each of the client 102, messaging application 290, executing application 288, client service 254, user console 270, phone system 280 and watch dog service 252 may comprise a program, service, task, script, library, application or any type and form of executable instructions or code executable on one or more processors. Any of the client 102, messaging application 290, executing application 288, client service 254, user console 270 and watch dog service 252 may be combined into one or more modules, applications, programs, services, tasks, scripts, libraries, applications, or executable code.

Referring to FIG. 3 in a general overview, FIG. 3 depicts an implementation of a method 300 for identifying providing electronic password training to one or more users that have passwords associated with one or more data breaches. In step 310, method 300 may include executing a password breach test to determine users with passwords associated with one or more data breaches. In some examples, the method 300 may include determining a plurality of users with passwords associated with one or more data breaches, and a type of password breach for each of these users (step 320). Method 300 may include selecting one or more users with a first type of password breach (step 330). In some embodiments, responsive to the selection and based on the type of password breach, the method 300 may include generating an electronic training campaign configured to train the one or more users on using passwords (step 340). Method 300 may include communicating the electronic training campaign to one or more devices of the one or more users (step 350). In step 360, method 300 may include establishing a risk score for each of the plurality of users and/or for an entity based on the type of password breach and/or the results from the electronic training. Method 300 may also include changing one or more user properties responsive to the user's risk score or an entity risk score (step 370).

Referring to FIG. 3 in more detail, FIG. 3 may include executing a password breach test to determine users with passwords associated with one or more data breaches (step 310). In some examples, server 106 may execute a password breach test on users that are members of an organization or employees of a company. In examples, server 106 may execute a password breach test on a subset of members of an organization or on a subset of employees of a company. For example, server 106 may execute a password breach test on employees that have a risk score which indicates that such employees may be more vulnerable to a password breach. In some examples, server 106 may periodically execute a password breach test on one or more users. The time between periodically executed password breach tests may be reduced for users that have a high risk score, as compared to users that have a low risk score.

In some examples, server 106 may communicate with one or more external breached password databases 240 to determine one or more users have a password that has been associated with a password breach. Server 106 may query external breached password database to determine which one or more users have been associated with a password breach. In some examples, server 106 may use an SQL query to query external breached password database 240. In some examples, server 106 may provide user email addresses, for example corporate user email addresses, in a query to eternal breached password database 240. In examples, server 106 may provide passwords in a query to external breached password database. Passwords provided may be encrypted and/or hashed, for example with a SHA-1 hash. In some embodiments, server 106 may register with external breached password database 240 to receive notifications if any user of a list of users has been associated with a data breach. In examples, server 106 may register with external breached password database 240 to receive notifications if one or more passwords has been associated with a data breach.

In some examples, the method 300 may include determining a plurality of users with passwords associated with one or more data breaches, and a type of password breach for each of these users (step 320). In some examples, the results of one or more breached password tests may be used to determine a plurality of users with passwords associated with one or more data breaches. In embodiments, server 106 may receive notice for a third-party system which monitors for password breaches for users. In some embodiments, server 106 may classify data breaches into one or more types of data breaches. For example, one type of data breach is where a user's password has been associated with a breach. Another type of data breach is where a second user associated with the same (or a related) domain as the user has their password associated with a breach. Other types of data breaches include where a user has used the same password with more than one login username or email address, and that password has been associated with a breach for one of the login usernames or email addresses. It may be possible for bad actors to associate the alternate username or email address with the user and hence gain access to more accounts of the user. Upon determining one or more users of a plurality of users has a password associated with one or more data breaches, system 106 may for groups of users whereby members of a group of users have been subject to the same type of password breach. Method 300 may include selecting one or more users with a specific type of password breach from a group of users who have been subject to the same type of password breach (step 330). In some embodiments, responsive to the information, the method 300 may include identifying the user as failing to comply to user IT policies and/or entity IT policies.

In some embodiments, responsive to the selection and based on the type of password breach, the method 300 may include generating an electronic training campaign configured to train the one or more users on using passwords (step 340). In some examples, server 106 may select a user from a from a group of users who have been subject to the same type of password breach. The user may be selected from a group of users that share a specific user characteristic. In one embodiment, the user may be selected from a group of users who have not received password electronic training. The user may be identified through integration of the company's active directory. The user may be selected based on a time-based determination. For example, the user may be selected because of an amount of time that has passed since they last had password training, or for example the amount of time since the user had last been involved in a data breach. A user or a group of users may be selected based on a risk profile for the user or group of users. For example, the user may be selected because users that share similar characteristics to the user have been historically more prone to password breaches. In some examples, the content of the password electronic training can be tailored to the user through knowledge of the user's situation or location, the type of user passwords that the user has historically used, the user breach history, the user's compliance to user IT policies and/or entity IT policies, etc. Artificial intelligence and/or machine learning may be used to create content that is targeted towards a user or group of users, for example by customized training generator 214. In some embodiments, password electronic training campaign manager 210 may use, for example, knowledge of the user's situation or location, the type of user passwords that the user has historically used, the user breach history, the user's compliance to user IT policies and/or entity IT policies to select a predetermined template or set of templates that may be used, or may be modified to be used, for the password electronic training campaign.

In some embodiments the method 300 may include generating an electronic training campaign configured to train the one or more users on using passwords (step 340) where the campaign is selected based upon the type of password breach that was detected. In some examples where a user is found to have used a password associated with a breach related to another user on the same (or related) domain, a training campaign that teaches the risks associated with password sharing may be selected. In some examples where the same password was found to be related to more than one breach associated with that user, a training campaign that teaches the risks associated with password reuse may be selected.

Method 300 may include communicating the password electronic training campaign to one or more devices of the one or more users (step 350). Password electronic training can be delivered to the user by sending the user a new message with a link that takes them to the remedial training materials. The client service 254 may create a pop up on a user device using the user console 270. In some examples the user console 270 generates the pop up immediately after the user's password has been determined to be associated with a breach. In some examples, the user console 270 generates the pop up after user's password has been determined to be associated with a breach and when the user next tries to access their device. In some examples, the system may lock processes on the user's device and may generate a pop up which notifies the user that they need to complete remedial training. The remedial training may be part of the pop up that is displayed to the user on the user device. The pop up which may be displayed on the user device may include a link to a landing page where the user may access remedial training. In some examples, the training completion monitor 220 may track all the remedial training that is completed by the user, started and not completed by the user, and not started by the user.

Client service 254 interacts with user console 270 which runs in the user space allowing the system to pop up messages that target the user with dialogs. If the user's password has been associated with a data breach, client service 254 may interact with user console 270 to create a pop up for the user and to activate process lock 282 such that the user cannot use any of the processes running on the client device. The client 102 may include user pop up training 292 which is provided via the user pop up created by user console 270. Client service 254 may also start a user console 270 for every user that logs into a user profile. There may be several instances of the user console 270 for every logged in user. Client service 254 monitors and can in some instances control user console 270 when initiated (e.g., initiate user pop up training 292, or temporarily pause execution of an application using process lock 282, such as pausing execution of a web browser).

The training generated by customized training generator 214 may be of any appropriate format. For example, training may be provided in the form of email messages, text or SMS messages, messages used by particular messaging applications such as, e.g. WhatsApp™ (Facebook, Menlo Park, California), or any other type of message. Training may be provided as videos, documents, interactive games, interactive chats, or other content types to be used in a particular training campaign selected by e.g. server 106 using password electronic training campaign manager 210. Messages and/or content may be generated in any appropriate manner, e.g. by running an instance of an application that generates the desired message type, such as running e.g. a Gmail™ application (Google, Mountain View, California), Microsoft Outlook™ (Microsoft, Redmond, Wash.), a text messaging application, or any other appropriate application. The messages may be generated by running a messaging application on e.g. virtual machine 216 or may simply be run on an operating system of server 106 or may be run in any other appropriate environment. The messages may be generated to be formatted consistent with specific messaging platforms, for example Outlook 365 (Microsoft, Redmond, Washington), Outlook Web Access (OWA) (Microsoft, Redmond, Washington), Webmail, iOS (Apple, Cupertino, California), Gmail client (Google, Mountain View, California), and so on. In some embodiments, the customized training generator 214 can be configured to generate messages having the ability to traverse users who interact with the messages to a specific landing page to provide further training.

In some embodiments, customized training generator 214 can be configured to generate a simulated phishing email which tests one or more password IT policies. The email can appear to be delivered from a trusted email address, such as the email address of an executive of the company at which the targeted user is employed. In addition, the email can have a "Subject:" field that is intended to cause the user to take an action, such as sending their password or credentials or changing their password. In some embodiments, customized training generator 214 can generate one or more simulated phishing emails which are stored in the password training modules storage 218. In some embodiments, customized training generator 214 can generate multiple instances of the email which may be delivered to multiple users, such as a subset of all of the employees of the company. In some embodiments, customized training generator 214 can generate multiple instances of the email which may be delivered to a user group. For example, server 106 can select any number of employees who should be targeted by a simulated password training test, can create a user group and store this user group in memory 122. Customized training generator 214 can retrieve this information from memory 122 and can generate a set of emails similar to the email, each addressed to a respective target identified in the information stored in the memory 122. That is, customized training generator 214 can generate the emails such that the "From:" and "Subject:" fields of each email are identical, while the "To:" field is adjusted according to the desired targets.

In an implementation, password electronic training campaign manager 210 may be e.g., another name for a system administrator, such as a security manager, a third-party security consultant, a risk assessor, or any other party that uses the password electronic training campaign manager 210 installed on a server. Server 106 may wish to direct a simulated password training test by interacting with the password electronic training campaign manager 210 installed on the server. In an implementation, password electronic training campaign manager 210, when executed, causes a graphical user interface to be displayed to server 106. In other embodiments, password electronic training campaign manager 210 allows for user input through a non-graphical user interface, such as a user interface that accepts text or vocal input without displaying an interactive image.

In an implementation, password electronic training campaign manager 210 and/or server 106 may make choices concerning how password training is to be carried out. For example, a graphical user interface run by password electronic training campaign manager 210 may be displayed to server 106. An administrator, via server 106, may input parameters for the training that affect how it will be carried out. For example, via server 106 an administrator may make choices as to which users to include as potential recipients of the training, the method of determining which users are to be selected as potential recipients of the training, the timing of various aspects of the training, whether to use a training module that includes values for one or a plurality of password failure indicators, how responses from targeted users should be uniquely identified, and other choices. These choices may be made by selecting options displayed on a graphical user interface from dropdown menus, being presented with choices through a training wizard, or in any other appropriate manner.

In an implementation, the password electronic training campaign manager 210 may allow server 106, such as via application programming interfaces (APIs), to access and/or change settings of an account maintained with any party involved with the training, such as, for example, a third party security service provider, or may allow server 106 to access and/or change settings of an account maintained with a third party security service provider, such as one that e.g. manages an exploit server, view bills and/or make payments to a third party security service provider, to perform these functions with other third parties involved in the training, or provide any other functions that would be appropriate for facilitating communications between server 106 and any other parties involved in the training.

In step 360, method 300 may include establishing a risk score for each of the plurality of users and/or for an entity based on the type of password breach and/or the results from the electronic training.

Method 300 may also include changing one or more user properties responsive to the user's risk score or an entity risk score (step 370). Risk score manager 234 may monitor and control inputs and various other system aspects which would lead to the adjustment of user or entity risk scores, for example in response to updated information in external breached password database 240, or inputs from password sharing detection manager 228, weak password detection manager 240, password IT policy compliance manager 242, and/or training completion monitor 220. Risk score manager 234 may update user risk scores in user risk scores storage 238, and/or entity risk scores in entity risk scores storage 236, in response to completion of one or more training modules and/or training campaigns and may process requests for access to risk scores and/or may perform other tasks related to the management of risk scores for users and/or entities.

The user and/or entity risk scores may include a reference identifiers and/or time stamps, which enable risk score manager 234 to track risk scores over time. When the system provides training to a user, the training may include the user's reference identifier in the metadata of the training, which may be used by system 200 to track the details and timing of the delivery and completion of training provided to the user. In some examples, password IT policy manager 222 and/or password electronic training campaign manager 210 may use a reference identifier to make inquiries, respond to inquiries, and generate reports for a user or group of users. Password electronic training campaign manager 210 may alert password IT policy manager 222 when a user, or a group of users, has failed the password security awareness training. In some embodiments, the reference identifier may be used in alerts and notifications to identify a particular user.

The systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMS, RAMS, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method comprising:
   identifying, by one or more processors, one or more types of password breach that occurred as part of one or more existing data breaches;
   selecting, by the one or more processors, one or more users having a type of password breach, of the one or more types of password breach, that occurred as part of the one or more existing data breaches;
   communicating, by the one or more processors, an electronic training based at least on the type of password breach to the selected one or more users that occurred as part of the one or more existing data breaches; and
   adjusting, by the one or more processors, a risk score of the selected one or more users based at least on results of the electronic training and at least on the type of password breach that occurred as part of the one or more existing data breaches.

2. The method of claim 1, further comprising determining, by the one or more processors, the adjustment to the risk score based at least on the type of password breach.

3. The method of claim 1, further comprising generating, by the one or more processors, the electronic training based at least on the type of password breach.

4. The method of claim 1, further comprising selecting, by the one or more processors, the one or more users from a group of users having a same type of password breach.

5. The method of claim 1, further comprising classifying, by the one or more processors, the one or more password breaches into a type of password breach.

6. The method of claim 5, further comprising determining, by the one or more processors, the electronic training based at least on the type of data breach.

7. The method of claim 1, further comprising identifying, by the one or more processors, the one or more users as having one or more passwords subject to the one or more data breaches.

8. The method of claim 1, further comprising identifying, by the one or more processors, the one or more users as having one or more weak passwords.

9. The method of claim 8, further comprising determining, by the one or more processors, the one or more users as having one work weak passwords based at least on one or more weak password tests.

10. The method of claim 8, further comprising adjusting, by the one or more processors, the risk score of the one or more users responsive to identifying the one or more users as having one or more weak passwords.

11. A system comprising:
    one or more processors, coupled to memory and configured to:
    identify one or more types of password breach that occurred as part of one or more existing data breaches;
    select one or more users having a type of password breach, of the one or more types of password breach, that occurred as part of the one or more existing data breaches;
    communicate an electronic training, based at least on the type of password breach that occurred as part of the one or more existing data breaches, to the selected one or more users; and,
    adjust, a risk score of the selected one or more users based at least on results of the electronic training and at least on the type of password breach that occurred as part of the one or more existing data breaches.

12. The system of claim 11, wherein the one or more processors are further configured to determine the adjustment to the risk score based at least on the type of password breach.

13. The system of claim 11, wherein the one or more processors are further configured to generate the electronic training based at least on the type of password breach.

14. The system of claim 11, wherein the one or more processors are further configured to select the one or more users from a group of users having a same type of password breach.

15. The system of claim 11, wherein the one or more processors are further configured to classify the one or more password breaches into a type of password breach.

16. The system of claim 15, wherein the one or more processors are further configured to determine the electronic training based at least on the type of data breach.

17. The system of claim 11, wherein the one or more processors are further configured to identify the one or more users as having one or more passwords subject to the one or more data breaches.

18. The system of claim 11, wherein the one or more processors are further configured to identify the one or more users as having one or more weak passwords.

19. The system of claim 18, wherein the one or more processors are further configured to identity the one or more users as having one work weak passwords based at least on one or more weak password tests.

20. The system of claim 18, wherein the one or more processors are further configured to adjust the risk score of the one or more users responsive to identifying the one or more users as having one or more weak passwords.

* * * * *